(12) United States Patent
Phillips

(10) Patent No.: US 7,208,679 B2
(45) Date of Patent: Apr. 24, 2007

(54) COMBINATION ELECTRICAL BOX AND MOUNTING BRACKET ASSEMBLY

(76) Inventor: Michael Phillips, 4202 Englewood East, Johnson City, TN (US) 37601

( * ) Notice: Subject to any disclaimer, the term of this patent is extended or adjusted under 35 U.S.C. 154(b) by 0 days.

(21) Appl. No.: 11/122,553

(22) Filed: May 4, 2005

(65) Prior Publication Data

US 2006/0237211 A1   Oct. 26, 2006

Related U.S. Application Data

(60) Provisional application No. 60/674,139, filed on Apr. 22, 2005.

(51) Int. Cl.
*H01H 9/02* (2006.01)

(52) U.S. Cl. .............. 174/58; 174/60; 174/61; 174/64; 174/135; 248/343

(58) Field of Classification Search .......... 174/58, 174/60, 61, 135, 64; 220/3.2, 3.7, 3.9; 248/906, 248/343

See application file for complete search history.

(56) References Cited

U.S. PATENT DOCUMENTS

| | | | | |
|---|---|---|---|---|
| 2,233,548 A | * | 3/1941 | Mroziak | 248/219.4 |
| 3,476,343 A | * | 11/1969 | Burrell | 248/216.4 |
| 3,928,716 A | * | 12/1975 | Marrero | 174/57 |
| 4,747,506 A | * | 5/1988 | Stuchlik, III | 220/3.9 |
| 6,573,446 B1 | * | 6/2003 | Umstead et al. | 174/50 |
| 6,800,806 B1 | * | 10/2004 | Grday | 174/50 |

* cited by examiner

*Primary Examiner*—Dhiru R. Patel
(74) *Attorney, Agent, or Firm*—Carter DeLuca Farrell & Schmidt, LLP

(57) ABSTRACT

A combination electrical box and mounting bracket assembly is provided which includes an electrical box and a mounting bracket attached to the electrical box. The mounting bracket is configured and dimensioned for enabling the mounting bracket to be secured to a truss joist, especially to a floor truss joist, such as a TGI floor I truss joist. The mounting bracket is contoured to resemble the shape of a portion of the floor truss joist at which the mounting bracket is secured to. The combination assembly significantly reduces the force applied to the electrical box by electrical equipment and/or devices connected to wires/cable received by the electrical box as compared to prior art mounting brackets by distributing the force to a larger surface area of the mounting bracket and truss joist.

5 Claims, 5 Drawing Sheets

COMBINATION ELECTRICAL BOX AND MOUNTING BRACKET ASSEMBLY

PRIORITY

This application claims priority to a provisional application having the same title which was filed on Apr. 22, 2005 and assigned U.S. Provisional Application Ser. No. 60/674,139; the entire contents of which are incorporated herein by reference.

TECHNICAL FIELD

The present disclosure relates generally to a tool and more specifically to a combination electrical box and mounting bracket assembly for securely mounting an electrical box to a truss or other structural element and for supporting the electrical box and any electrical equipment and/or devices connected to the electrical box. The mounting bracket is preferably welded to the electrical box to form the combination in accordance with the present disclosure. The present disclosure also provides for the mounting bracket to be separate and apart from the electrical box and to be attached to the electrical box at a later time.

BACKGROUND

Traditionally, in order to mount an electrical box to a truss joist 10 (see FIG. 1), especially to a floor truss joist, such as a TGI floor I truss joist, or other structural element, a bracket 12 is attached to the electrical box 14, as shown by FIG. 1, via welding or other means. The bracket 12 includes holes for passing there through nails, screws or other fastening members for securing the electrical box 14 to a front face 16 of a beam 18 of the TGI floor I truss joist 10. Electrical equipment and/or devices, such as lighting fixtures, monitor, video camera, television, etc., can then be connected to electrical wires or data cables received by the electrical box 14 as known in the art.

The force applied by the weight of the electrical equipment and/or devices to the connection (e.g., weld spot) between the electrical box 14 and the bracket 12, as well as the force applied to the nails or screws 16, over time can dislodge the electrical box 14 from the bracket 12, or dislodge the bracket 12 from the truss joist 10. In an effort to prevent this from occurring, an electrician installing the electrical box 14 typically adds a wooden block 19 (see FIG. 2) in a gap "G" formed between the bracket 12 and a center panel 20 of the TGI floor I truss joist 10. The wooden block 19 is secured via nails, screws or other fastening members to the bracket 12 and the center panel 20 for reducing the force applied by the weight of the electrical equipment and/or devices to the connection (e.g., weld spot) between the electrical box 14 and the bracket 12, as well as the force applied to the nails, screws or other fastening members, thereby preventing or prolonging the dislodgement (or loosening) of the electrical box 14 from the bracket 12, or the dislodgement (or loosening) of the bracket 12 from the truss joist 10.

Although, the addition of a wooden block 19 within the gap "G" tends to aid in preventing or prolonging the dislodgement (or loosening) of the electrical box 14 from the bracket 12, or the dislodgement (or loosening) of the bracket 12 from the truss joist 10, an electrician installing the electrical boxes 14 needs to have at his disposal several wooden blocks 19 which are sized to fit within gaps formed between brackets 12 and center panels 20 when working at a construction site. Additionally, the need to have each wooden block 19 fastened to a respective bracket 12 and a center panel 20, prolongs the construction job and cost of the construction project.

Accordingly, there exists a need for a combination electrical box and mounting bracket assembly adapted for mounting the electrical box to a truss or other structural element, especially to a floor truss joist, such as a TGI floor I truss joist, which overcomes the shortcomings and disadvantages of prior art brackets and mounting methods.

There also exists a need for a mounting bracket adapted for being connected to an electrical box for mounting the electrical box to a truss or other structural element, especially to a floor truss joist, such as a TGI floor I truss joist, which overcomes the shortcomings and disadvantages of prior art brackets and mounting methods.

There also exists a need for a method to quickly and securely mount an electrical box to a TGI floor I truss joist which prevents the dislodgement (or loosening) of the electrical box from the TGI floor I truss joist.

SUMMARY

An aspect of the present disclosure is to provide a combination electrical box and mounting bracket assembly for securing an electrical box to a structural element, such as a stud, wall panel, and truss, especially to a floor truss joist, such as a TGI floor I truss joist.

The combination electrical box and mounting bracket assembly according to the present disclosure includes an electrical box and a mounting bracket attached to the electrical box, such as by spot welding, an adhesive, etc. The mounting bracket is configured and dimensioned for enabling the mounting bracket to be secured by nails, screws or other fastening members to a truss joist, especially to a floor truss joist, such as a TGI floor I truss joist, using holes provided on the mounting bracket. The mounting bracket is contoured to resemble the shape of a portion of the floor truss joist at which the mounting bracket is secured to. The combination assembly significantly reduces the force applied to the electrical box by the weight of electrical equipment and/or devices connected to electrical wires or data cables received by the electrical box as compared to prior art mounting brackets by distributing the force to a larger surface area of the mounting bracket and truss joist.

The present disclosure also provides a mounting bracket adapted for attachment by spot welding or other means to an electrical box. The mounting bracket is configured and dimensioned for enabling the mounting bracket to be secured by nails, screws or other fastening members to a truss joist, especially to a floor truss joist, such as a TGI floor I truss joist, using holes provided on the mounting bracket. The mounting bracket is contoured to resemble the shape of a portion of the floor truss joist at which the mounting bracket is secured to. The mounting bracket significantly reduces the force applied to the electrical box by the weight of electrical equipment and/or devices attached to electrical wires/data cables received by the electrical box as compared to prior art mounting brackets by distributing the force to a larger surface area of the mounting bracket and truss joist.

A method is also provided for mounting an electrical box to a TGI floor I truss joist. The method includes the steps of providing a mounting bracket and attaching or adjoining the mounting bracket to the electrical box. The method further includes the step of securing the mounting bracket to the TGI floor I truss joist by nails, screws or other fastening members using holes provided on the mounting bracket for securely mounting the electrical box to the TGI floor I truss joist.

The mounting bracket is preferably unitarily tooled from a metallic plate and contoured to resemble the shape of a portion of the floor truss joist at which the mounting bracket is secured to. Specifically, for mounting to a TGI floor I truss joist, the mounting bracket is L-shaped and has a lip portion perpendicular to the horizontal portion of the "L" and parallel to the vertical portion of the "L". The mounting bracket significantly reduces the force applied to the electrical box by the weight of electrical equipment and/or devices attached to electrical wires/data cables received by the electrical box as compared to prior art mounting brackets by distributing the force to a larger surface area of the mounting bracket and TGI floor truss I joist.

DETAILED DESCRIPTION OF THE PREFERRED EMBODIMENTS

Figure 3:
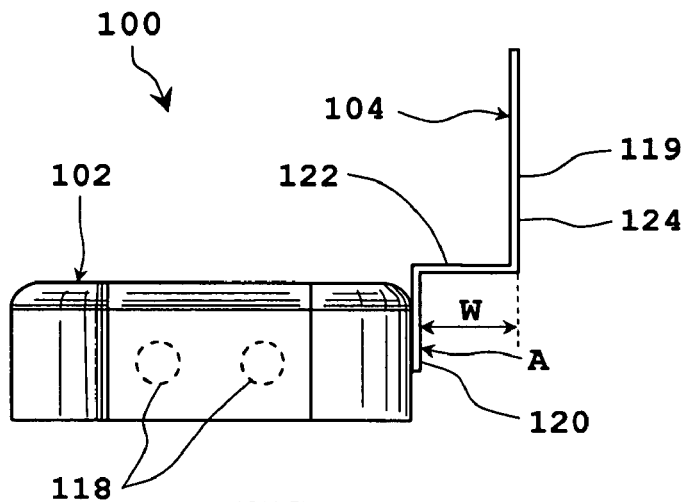
FIG. 3 is a side view showing the combination electrical box and mounting bracket assembly in accordance with the present disclosure.
Figure 4:
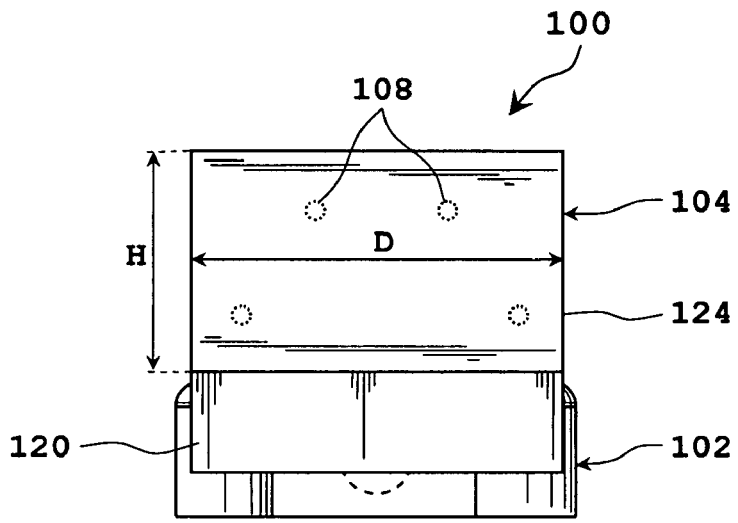
FIG. 4 is a back view of the combination electrical box and mounting bracket assembly shown in FIG. 3.
Figure 5:
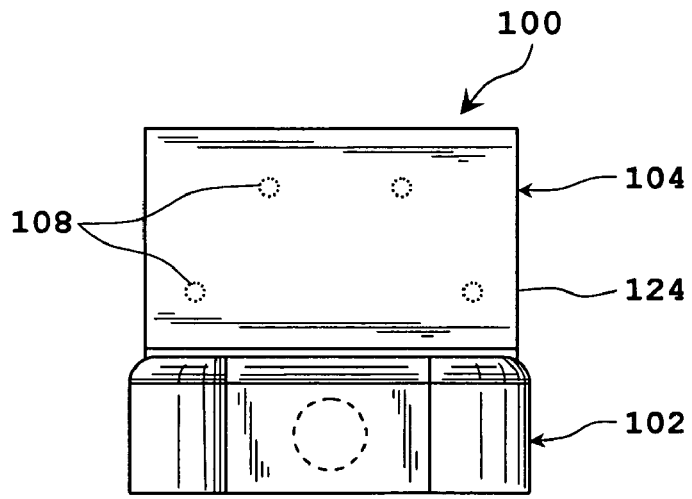
FIG. 5 is a front view of the combination electrical box and mounting bracket assembly shown in FIG. 3.
Figure 6:
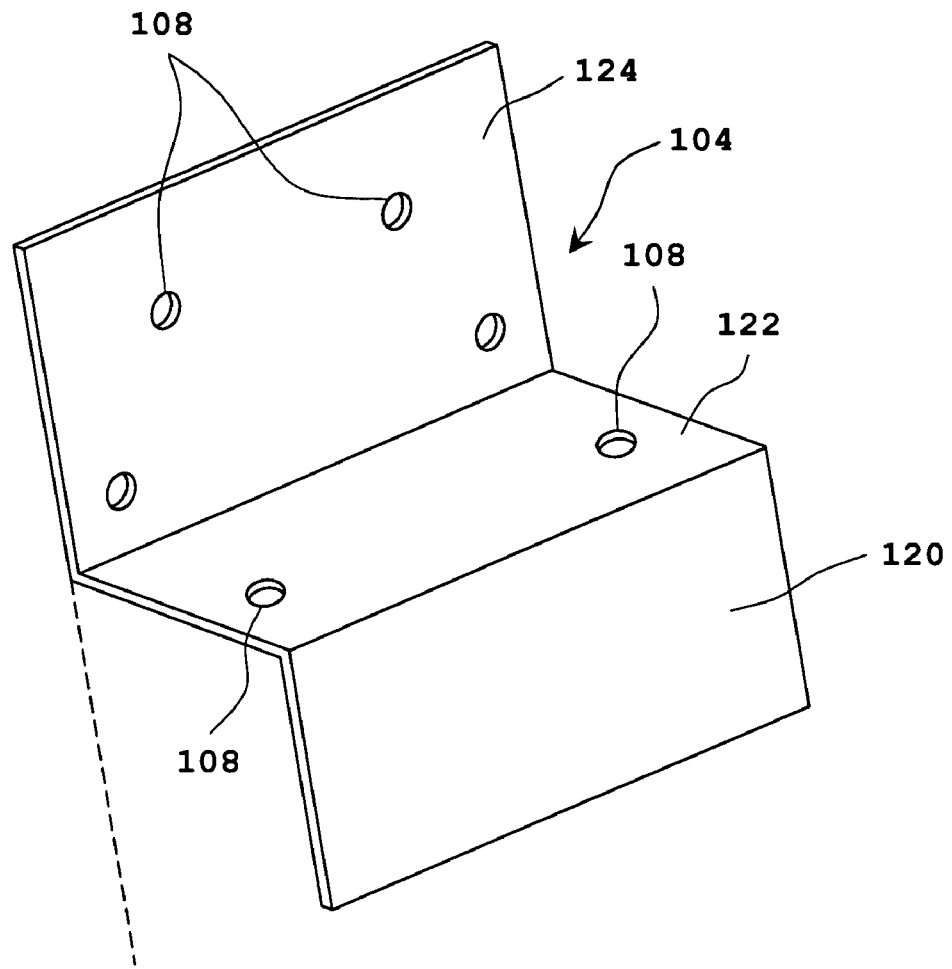
FIG. 6 is a perspective view showing the mounting bracket in accordance with the present disclosure.

With reference to FIG. 3–5, there are shown various views of the combination electrical box and mounting bracket assembly in accordance with the present disclosure and designated generally by reference numeral 100. The assembly 100 includes an electrical box 102 and a mounting bracket 104 (see FIG. 6). The mounting bracket 104 is preferably metallic and adjoined or attached to the electrical box 102 at "A" by spot welding or other means known in the art, such as an adhesive, to form the combination assembly 100 in accordance with the present disclosure.

The electrical box 102 is of the type for receiving an electrical wire and/or data cable. The electrical box 102 can also be a box housing a lighting fixture or the like. The electrical box 102 can also be an electrical device, such as a monitor, surveillance camera, etc.

Figure 7:
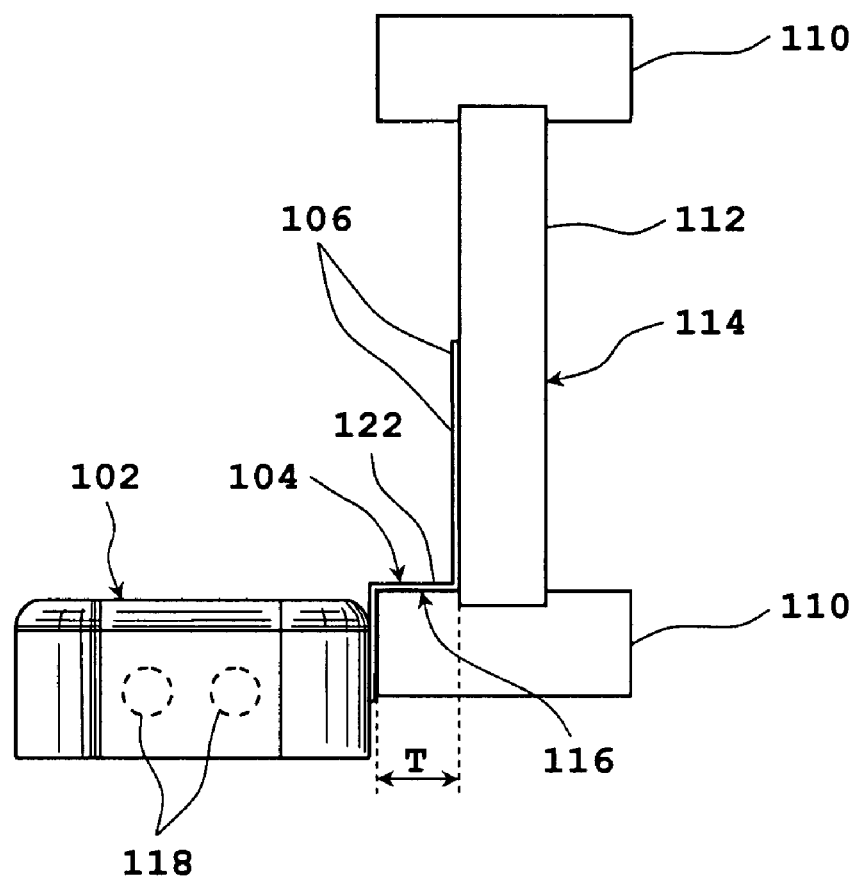
FIG. 7 is a side view showing the combination electrical box and mounting bracket assembly shown in FIGS. 3–5 mounted to a TGI floor I truss joist.

At a job site, the mounting bracket 104 is used to securely mount the electrical box 102 to a truss, especially to a floor truss, such as a TGI floor I truss joist 114 (see FIG. 7), or other structural element, such as a stud, wall panel, etc., using nails, screws or other fastening members 106. As shown by FIG. 7, the fastening members 106 are traversed through holes 108 provided on the mounting bracket 104 and fastened to a beam 110 and/or panel 112 of the TGI floor I truss joist 114. The panel 112 connects two beams 110 of the TGI floor I truss joist 114.

The present disclosure also provides for the mounting bracket 104 to be manufactured and sold separate and apart from the electrical box 102. The mounting bracket 104 is subsequently attached to the electrical box 102 at a job site or elsewhere by spot welding or other means known in the art to form the combination assembly 100 in accordance with the present disclosure. The electrical box 102 can be attached to the mounting bracket 104 after the mounting bracket 104 is attached to the truss joist 114 or before.

Figure 1:
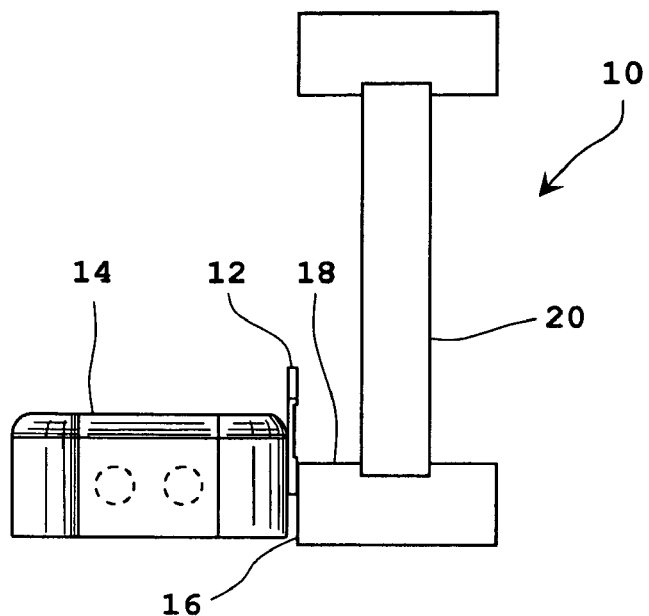
FIG. 1 is a side view showing an electrical box mounted to a truss joist using a prior art bracket.
Figure 2:
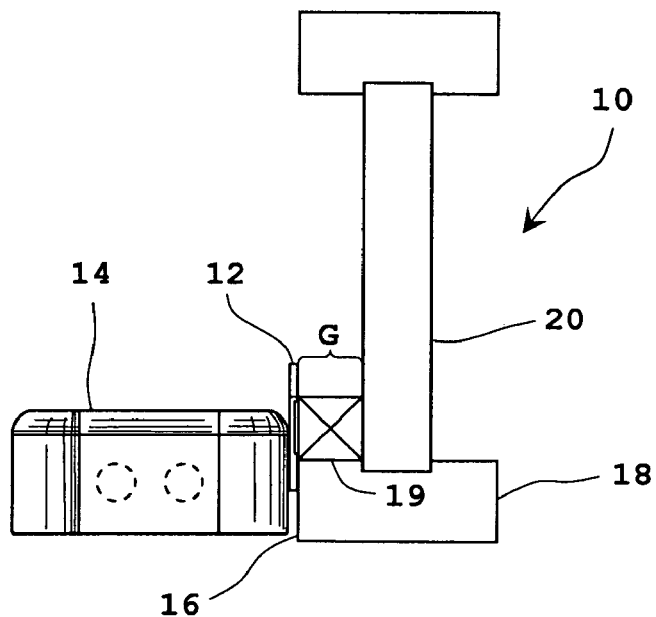
FIG. 2 is a side view showing a block provided between the prior art bracket shown in FIG. 1 and the truss joist.

The mounting bracket 104 is contoured to resemble the shape of a portion 116 of the floor truss joist 114 at which the mounting bracket 104 is secured to. Accordingly, this design of the mounting bracket 104 significantly reduces the force applied to the electrical box 102 by the weight of electrical equipment and/or devices attached to electrical wires/data cables received by the electrical box 102 as compared to prior art mounting brackets, such as bracket 12 shown in FIGS. 1 and 2, by distributing the force to a larger surface area of the mounting bracket 104 and truss joist 114. Additionally, with reference to FIGS. 4 and 5, the holes 108 are arranged in a semicircle to evenly distribute the force applied to the mounting bracket 104 to the surface area of the mounting bracket 104, as well as to the surface area of the truss joist 114.

Cut-outs or knock-outs 118 are provided on the electrical box 102 to enable an electrician to pass non-metallic sheathed cable, armored cable, flexible metal conduit and the like for installing electrical equipment and/or devices.

The mounting bracket 104 is preferably unitarily tooled from a durable, heavy-duty metallic plate having a thickness of about 0.0625 inches. Preferably, the metallic plate is galvanized steel.

With continued reference to FIGS. 3–5, the metallic plate during tooling or manufacturing is contoured to resemble the shape of the portion 116 of the floor truss joist 114 at which the mounting bracket 104 will be secured to. Specifically, for mounting to a TGI floor I truss joist 114, the mounting bracket 104, as shown by the various figures, includes an L-shaped plate 119 having a horizontal portion 122 and a vertical portion 124 positioned on a first end of horizontal portion 122. A lip 120 is positioned on a second end of horizontal portion 122, the lip 120 protruding substantially perpendicularly in a downward direction from the horizontal portion 122 of L-shaped plate 119 (FIG. 6) and being substantially parallel to the vertical portion 124 of L-shaped plate 119.

The horizontal portion 122 preferably has a width "W" (FIG. 3) substantially equal to the width of portion "T" of the TGI floor I truss joist 114 (FIG. 7). Preferably, the horizontal portion 122 ranges in size from about 14.5 cm to about 15.5 cm. The height "H" (FIG. 4) of the vertical portion 124 preferably ranges in size from about 40.0 cm to about 44.0 cm, and the depth "D" (FIG. 4) of the mounting bracket 104 preferably ranges in size from about 50.0 cm to about 60.0 cm.

The dimensions of the mounting bracket 104 can differ from the above dimensions according to the amount of force which needs to be distributed to the surface area of the mounting bracket 104 and truss joist 114. The amount of force is based on the weight of the electrical equipment and/or devices.

As evident from the above description, the combination assembly 100 and mounting bracket 104 of the present disclosure enables an electrician at a job site to quickly and securely mount an electrical box to a truss or other structural element as compared to prior art brackets and methods. In accordance with the present disclosure, the electrician positions the mounting bracket 104 such that the lip portion 120 abuts a front face 121 of the beam 110, the horizontal portion 122 abuts a top portion of the beam 110, and the vertical portion 124 abuts the panel 112 of the truss joist 114.

The electrician then mounts the mounting bracket 104 (if separate from the combination assembly 100) or combination assembly 100 to the truss joist 114 by using fastening members 106. The fastening members 106 can be combination screw heads (pre-inserted within holes 108) for faster installation.

Figure 6A:
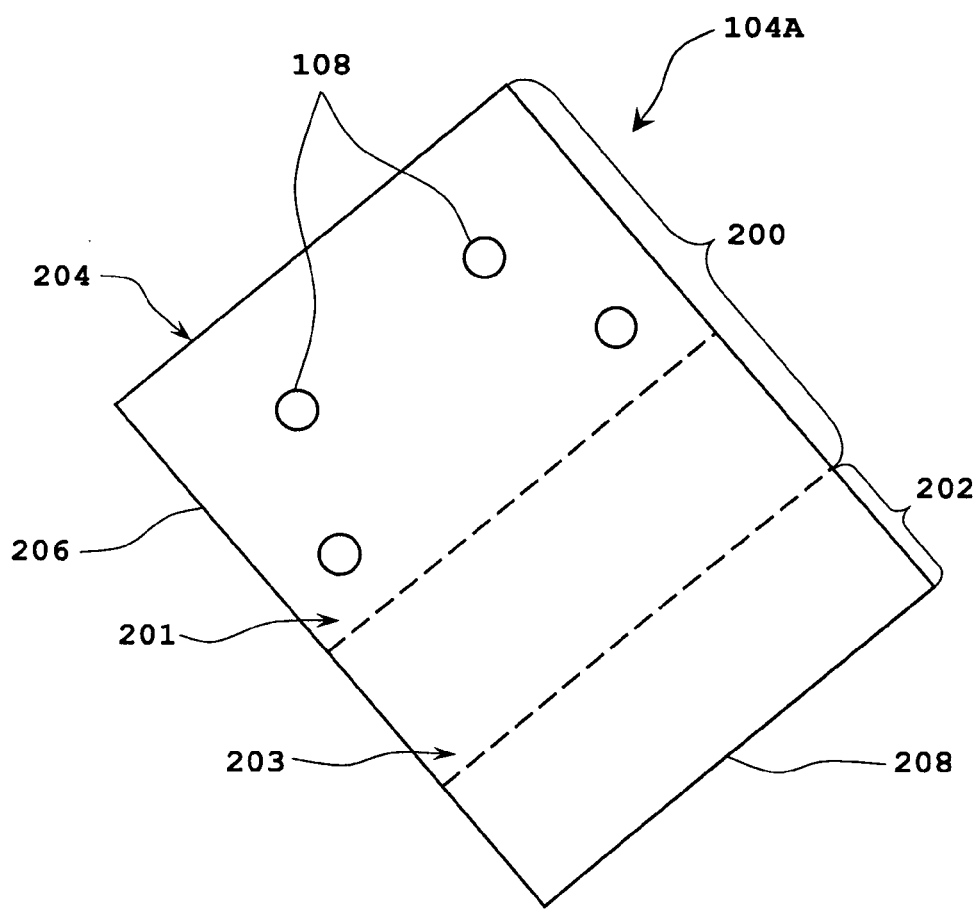
FIG. 6A is a perspective view showing an alternate embodiment of the mounting bracket having weakened areas for bending thereat and an adhesive covered by an adhesive backing for adhesively mounting to a truss joist.

In an alternate embodiment, as shown by FIG. 6A, a mounting bracket 104A of the present disclosure enables an electrician at a job site to quickly and securely mount an electrical box to a truss or other structural element as compared to prior art brackets and methods. In accordance with the present disclosure, to mount the mounting bracket 104A to a TGI floor I truss joist, the electrician bends the mounting bracket 104A at weakened areas 201 and 203 to provide an L-shaped portion 200 and a lip portion 202 such that the mounting bracket 104A resembles the mounting bracket 104. The electrician then removes all or portions of an adhesive backing member 204 to uncover an adhesive 206 provided on a rear surface 208 of the mounting bracket 104A.

The electrician then positions the mounting bracket 104 such that the lip portion 202 abuts the front face 121 of the beam 110, a horizontal portion 210 abuts a top portion of the beam 110, and the vertical portion 212 abuts the panel 112 of the truss joist 114. The electrician then presses against the mounting bracket 104A to adhesively mount the mounting bracket 104A (if separate from the electrical box 102), or the electrical box 102 and the mounting bracket 104A if the electrical box 102 is adjoined to the mounting bracket 104A. This embodiment is desirable in applications where it is difficult or impossible to mount the mounting bracket 104A to the truss joist 114 or other structural element using nails, screws or other fastening members. The mounting bracket 104A is nonetheless provided with holes 108 for allowing the mounting thereof using nails, screws or other fastening members if desired or deemed necessary.

In accordance with the present disclosure, if the mounting bracket 104A is to be mounted to a different type of truss joist or structural element, the mounting bracket 104A can be provided with weakened areas at different locations than the areas shown by FIG. 6A for being shaped to resemble the shape of any desired truss joist or structural element.

It is contemplated that the mounting bracket 104A can be provided with a plurality of weakened areas for enabling the mounting bracket 104A to be bent in a plurality of shapes based on the application. This makes the mounting bracket 104A in accordance with the present disclosure versatile. It is also contemplated that the mounting bracket 104A can be mounted to a truss joist or other structural element using the adhesive and/or a fastening member without bending the mounting bracket 104A at the weakened areas WA1 and WA2, in applications where it is not desirable or it is not necessary to bend the mounting bracket 104A.

It is provided that the mounting bracket 104A can be attached or adjoined to the electrical box 102 before or after bending to provide a combination electrical box and mounting bracket assembly.

What has been described herein is merely illustrative of the principles of the present disclosure. For example, the combination assembly and mounting bracket described above and implemented as the best mode for operating the present disclosure are for illustration purposes only. Other arrangements and methods may be implemented by those skilled in the art without departing from the scope and spirit of this disclosure.

I claim:

1. A mounting bracket for mounting an electrical box to a structural element, said mounting bracket comprising:
   a first weakened area and a second weakened area, wherein the first weakened area is adapted for enabling bending of the mounting bracket for defining an L-shaped mounting bracket, and further wherein the second weakened area is adapted for enabling further bending of the L-shaped mounting bracket for defining a lip portion, the lip portion being adapted to adjoin said electrical box to said mounting bracket, the L-shaped mounting bracket defining at least one hole for receiving at least one fastening member along an axis parallel to at least one of a plane of a vertical portion of the L-shaped mounting bracket and a horizontal portion of the L-shaped mounting bracket.

2. The mounting bracket according to claim 1, wherein the lip portion extends from an end of said horizontal portion of the L-shaped mounting bracket and in an opposite direction from said vertical portion of the L-shaped mounting bracket and substantially parallel to the vertical portion.

3. The mounting bracket according to claim 2, wherein the structural element is a TGI floor I truss joist, and wherein the horizontal and lip portions abut a beam of the truss joist and the vertical portion abuts a panel of the truss joist connecting two beams of the truss joist upon adhesively mounting the electrical box to the truss joist via the adhesive.

4. The mounting bracket according to claim 1, further comprising an adhesive provided on a rear surface of said mounting bracket and covered by an adhesive backing member.

5. A method for mounting an electrical box to a structural element, comprising:
   providing a mounting bracket having a first weakened area and a second weakened area;
   bending the mounting bracket at the first weakened area for defining an L-shaped configuration;
   bending the mounting bracket at the second weakened area for defining a lip portion, wherein the lip portion extends substantially perpendicularly from a horizontal portion of the L-shaped configuration;
   adjoining the electrical box to the lip portion; and
   attaching the mounting bracket to a portion of the structural element by providing at least one fastening member through at least one hole defined by the L-shaped configuration and along an axis parallel to at least one of a plane of a vertical portion of the L-shaped configuration and the horizontal portion of the L-shaped configuration.

* * * * *